US011272568B2

(12) United States Patent
Shi et al.

(10) Patent No.: US 11,272,568 B2
(45) Date of Patent: Mar. 8, 2022

(54) COMMAND RECEPTION METHOD AND APPARATUS AND COMMUNICATION SYSTEM

(71) Applicant: FUJITSU LIMITED, Kawasaki (JP)

(72) Inventors: Yulong Shi, Beijing (CN); Meiyi Jia, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/356,636

(22) Filed: Mar. 18, 2019

(65) Prior Publication Data

US 2019/0239279 A1 Aug. 1, 2019

Related U.S. Application Data

(63) Continuation of application No. PCT/CN2017/096898, filed on Aug. 10, 2017.

(30) Foreign Application Priority Data

Jul. 28, 2017 (WO) ................ PCT/CN2017/094869

(51) Int. Cl.
*H04L 1/16* (2006.01)
*H04L 5/00* (2006.01)
(Continued)

(52) U.S. Cl.
CPC ........... *H04W 80/08* (2013.01); *H04L 1/1614* (2013.01); *H04L 1/18* (2013.01); *H04L 1/189* (2013.01);
(Continued)

(58) Field of Classification Search
CPC ....... H04W 80/08; H04W 4/70; H04W 76/15; H04W 28/065; H04L 1/1614; H04L 5/0098
See application file for complete search history.

(56) References Cited

U.S. PATENT DOCUMENTS 8,335,189 B2 * 12/2012 Wang ................ H04W 8/30
370/331
8,411,619 B2 * 4/2013 Lee ................ H04L 1/1614
370/328
(Continued)

FOREIGN PATENT DOCUMENTS

CN 101529781 A 9/2009
CN 101646224 A 2/2010
(Continued)

OTHER PUBLICATIONS

International Search Report issued by the State Intellectual Property Office of the P.R. China for corresponding International Patent Application No. PCT/CN2017/096898, dated Dec. 19, 2017, with an English translation.
(Continued)

*Primary Examiner* — Huy D Vu
*Assistant Examiner* — Bailor C. Hsu
(74) *Attorney, Agent, or Firm* — Myers Wolin, LLC

(57) ABSTRACT

A command reception method and apparatus and a communication system. The command reception method includes: receiving a command for activating or deactivating duplication transmission transmitted by a network device by using a bitmap field; and activating or deactivating duplication transmission of one or more packet data convergence protocol entities or radio bearers according to the bitmap field. Hence, one or more PDCP entities in the user equipment may be activated or deactivated with respect to duplication transmission modes.

9 Claims, 6 Drawing Sheets

(51) Int. Cl.
  *H04W 80/08* (2009.01)
  *H04W 76/15* (2018.01)
  *H04W 28/06* (2009.01)
  *H04W 4/70* (2018.01)
  *H04L 1/18* (2006.01)

(52) U.S. Cl.
  CPC ............ *H04L 5/0098* (2013.01); *H04W 4/70* (2018.02); *H04W 28/065* (2013.01); *H04W 76/15* (2018.02)

(56) References Cited

U.S. PATENT DOCUMENTS

| | | | |
|---|---|---|---|
| 8,687,508 | B2 | 4/2014 | Marinier et al. |
| 9,860,797 | B2* | 1/2018 | Basu Mallick ........ H04L 1/1614 |
| 2008/0059859 | A1 | 3/2008 | Marinier et al. |
| 2009/0016301 | A1 | 1/2009 | Sammour et al. |
| 2010/0130137 | A1 | 5/2010 | Pelletier et al. |
| 2014/0153529 | A1 | 6/2014 | Marinier et al. |
| 2016/0212661 | A1 | 7/2016 | Basu Mallick et al. |
| 2016/0365953 | A1 | 12/2016 | Kim et al. |
| 2017/0142770 | A1 | 5/2017 | Fu et al. |
| 2017/0303170 | A1 | 10/2017 | Uchino et al. |
| 2017/0353914 | A1* | 12/2017 | Jung ...................... H04W 48/18 |
| 2018/0098250 | A1* | 4/2018 | Vrzic ................ H04W 36/0016 |
| 2018/0270718 | A1* | 9/2018 | Wang ........................ H04L 1/08 |
| 2018/0279168 | A1 | 9/2018 | Jheng et al. |
| 2018/0309660 | A1* | 10/2018 | Loehr ................ H04W 36/0066 |
| 2018/0324641 | A1* | 11/2018 | Tsai ....................... H04L 69/321 |
| 2018/0367288 | A1* | 12/2018 | Vrzic ................ H04W 36/0069 |
| 2018/0368132 | A1* | 12/2018 | Babaei .................. H04W 80/02 |
| 2018/0368200 | A1* | 12/2018 | Jin ......................... H04W 76/15 |
| 2019/0289489 | A1* | 9/2019 | Yi ............................ H04L 1/189 |

FOREIGN PATENT DOCUMENTS

| | | |
|---|---|---|
| CN | 102421138 A | 4/2012 |
| CN | 103856312 A | 6/2014 |
| CN | 104980260 A | 10/2015 |
| CN | 105706482 A | 6/2016 |
| CN | 106301721 A | 1/2017 |
| EP | 3 133 843 A1 | 2/2017 |
| JP | 2015-201894 A | 11/2015 |
| JP | 2016-531506 A | 10/2016 |
| JP | 2017-513371 A | 5/2017 |
| KR | 10-2017-0043009 A | 4/2017 |
| WO | 2008/114198 A2 | 9/2008 |
| WO | 2015/062557 A1 | 5/2015 |
| WO | 2016/021661 A1 | 2/2016 |

OTHER PUBLICATIONS

Written Opinion of the International Searching Authority issued by the State Intellectual Property Office of the P.R. China for corresponding International Patent Application No. PCT/CN2017/096898, dated Dec. 19, 2017, with an English translation.
LG Electronics Inc., "Configurability of Packet Duplication in PDCP", Agenda Item: 10.2.3.1, 3GPP TSG-RAN WG2 Meeting #97bis, R2-1703509 (revision of R2-1701462), Spokane, USA, Apr. 3-7, 2017.
ZTE, "Consideration on the Activation/Deactivation of Data Duplication for CA", Agenda Item: 10.2.2, 3GPP TSG-RAN WG2 Meeting #98, R2-1704660, Hangzhou, China, May 15-19, 2017.
International Search Report issued by the State Intellectual Property Office of the P.R. China for corresponding International Patent Application No. PCT/CN2017/094869, dated Apr. 20, 2018, with an English translation.
Non-Final Office Action issued by the United States Patent and Trademark Office for corresponding U.S. Appl. No. 16/747,274, electronically delivered dated Jan. 15, 2021.
Notice of Reasons for Refusal issued by the Japan Patent Office for corresponding Japanese Patent Application No. 2020-502418, dated Feb. 2, 2021, with an English translation.
Extended European Search Report with the Supplementary European search report and the European search opinion Bsued by the European Patent Office for corresponding European Patent Application No. 17919076.4-1205, dated Feb. 10, 2021.
Vice-Chairwoman (Interdigital), "Report from NR User Plane Break-Out Session", Agenda Item: 11.1.1, 3GPP TSG-RAN WG2 NR Ad Hoc, R2-1707500, Qingdao, China, Jun. 27-29, 2017.
Huawei, "Email discussion summary on control of UL PDCP duplication", Agenda Item: 10.2.2, 3GPP TSG-RAN2 Meeting #98, R2-1704834, Hangzhou, China, May 15-19, 2017.
Notification of Reasons for Refusal by the Japan Patent Office issued for corresponding Japanese Patent Application No. 2020-502128, dated Feb. 16, 2021 with a full English translation.
OPPO, "The impact of duplication on MAC", Agenda Item: 10.3.1.11, 3GPP TSG RAN WG2#NR_AdHoc#2, R2-1706344, Qingdao, China, Jun. 27-29, 2017.
Nokia et al., "Duplication Impacts to MAC", Agenda Item: 10.3.1 .8, 3GPP TSG RAN WG2, Meeting #97bis, R2-1702639, Spokane, USA, Apr. 3-7, 2017.
Final Office Action issued by the United States Patent and Trademark Office for corresponding U.S. Appl. No. 16/747,274, electronically delivered dated Apr. 30, 2021.
First Notification of Office Action and Search Report issued by the China National Intellectual Property Administration for corresponding Chinese Patent Application No. 201780092345.6, dated Oct. 11, 2021, with an English translation.
First Notification of Office Action and Search Report issued by the China National Intellectual Property Administration for corresponding Chinese Patent Application No. 201780091949.9, dated Oct. 26, 2021, with an English translation.

* cited by examiner

COMMAND RECEPTION METHOD AND APPARATUS AND COMMUNICATION SYSTEM

CROSS REFERENCE TO RELATED APPLICATIONS

This application claims the benefit of International Application PCT/CN2017/096898 filed on Aug. 10, 2017, which claims priority to PCT/CN/2017/094869, filed on Jul. 28, 2017, the entire contents of each are incorporated herein by reference.

TECHNICAL FIELD

This disclosure relates to the field of communication technologies, and in particular to a command reception method and apparatus and a communication system.

BACKGROUND

Subjects related to next-generation wireless communication systems are under study in the 3rd Generation Partnership Project (3GPP). In order to support data transmission of high reliability, duplication transmission of packet data convergence protocol (PDCP) data in multiple links will be supported in the next generation systems. By using diversity gains of transmission of identical PDCP protocol data units (PDUs) on multiple different links, error probabilities of transmission of the PDCP PDUs may be lowered, and the reliabilities of services may be ensured.

Resource utilization of duplication transmission of the PDCP PDUs is only half of split transmission of the PDCP PDUs (i.e. transmitting different PDCP PDUs on different links). A large amount of radio resources are sacrificed in the duplication transmission of the PDCP PDUs, so as to improve reliabilities of data transmission.

Hence, when quality of the radio links is good and the split transmission may satisfy the reliabilities of the data transmission, it is needed to deactivate the duplication transmission and adopt the split transmission. And when the quality of the radio link deteriorates, in order to ensure the reliabilities of data transmission, it is needed to activate the duplication transmission.

And on the other hand, a network device will configure modes of PDCP PDU data transmission of a user equipment (UE) according to quality of current radio links and service demands, that is, activating or deactivating the duplication transmission.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that when a user equipment is simultaneously connected to multiple network devices (such as base stations) for multi-connection transmission, each network device may individually activate or deactivate a duplication transmission mode of the user equipment. However, there is currently no effective solution for how a network device specifically activates or deactivates one or more PDCP entities in the user equipment with respect to duplication transmission. And furthermore, there is also no effective solution for a problem of unmatching between the network device side and the user equipment side with respect to configuration of a duplication transmission mode.

Embodiments of this disclosure provide a command reception method and apparatus and a communication system, in which by transmitting a command for activating or deactivating duplication transmission by a network device to a user equipment via a bitmap field, one or more PDCP entities in the user equipment may be activated or deactivated with respect to duplication transmission modes.

According to a first aspect of the embodiments of this disclosure, there is provided a command reception method, including:

receiving a command for activating or deactivating duplication transmission transmitted by a network device by using a bitmap field; and activating or deactivating duplication transmission of one or more packet data convergence protocol entities or radio bearers according to the bitmap field.

According to a second aspect of the embodiments of this disclosure, there is provided a command reception apparatus, including:

a command receiving unit configured to receive a command for activating or deactivating duplication transmission transmitted by a network device by using a bitmap field; and a transmission processing unit configured to activate or deactivate duplication transmission of one or more packet data convergence protocol entities or radio bearers according to the bitmap field.

According to a third aspect of the embodiments of this disclosure, there is provided a communication system, including:

a network device configured to transmit a command for activating or deactivating duplication transmission by using a bitmap field; and a user equipment configured to receive the command transmitted by the network device, and activate or deactivate duplication transmission of one or more packet data convergence protocol entities or radio bearers according to the bitmap field.

An advantage of the embodiments of this disclosure exists in that by transmitting a command for activating or deactivating duplication transmission by a network device to a user equipment via a bitmap field, one or more PDCP entities in the user equipment may be activated or deactivated with respect to duplication transmission modes.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

DETAILED DESCRIPTION

Figure 1:
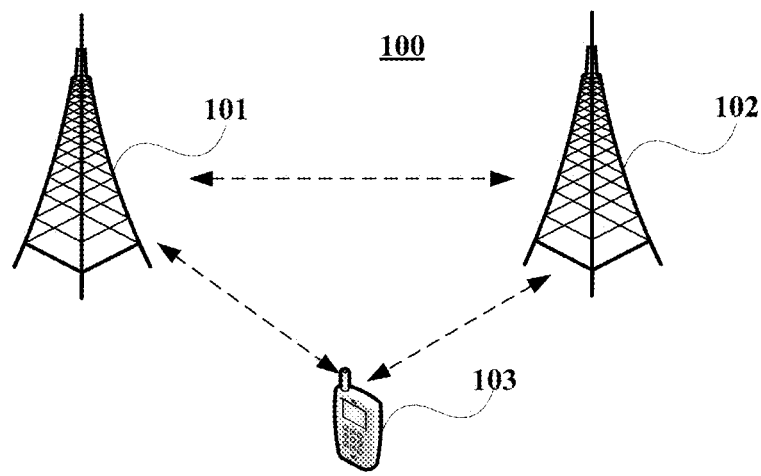
FIG. 1 is a schematic diagram of a communication system of an embodiment of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various implementations of the embodiments of this disclosure shall be described with reference to the accompanying drawings. These implementations are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

The base station includes but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a UE and a network device are taken as an example is schematically shown. As shown in FIG. 1, the communication system 100 may include a network device 101, a network device 102 and a UE 103. For the sake of simplicity, FIG. 1 shall be described by taking only one UE and two network devices as an example.

In the embodiment of this disclosure, existing traffics or traffics that may be implemented in the future may be performed between the network device 101 or 102 and the UE 103. For example, such traffics may include but not limited to enhanced mobile broadband (eMBB), massive machine type communication (MTC), and ultra-reliable and low-latency communication (URLLC), etc.

In the embodiment of this disclosure, when multiple PDCP entities of the UE perform duplication transmission, a certain network device may only activate or deactivate a part of the PDCP entities, and needs not to configure other PDCP entities. At this case, a new activation command format needs to be designed to support activation or deactivation of a part of the PDCP entities of the UE without changing transmission statuses of other PDCP entities.

It is to be noted that the embodiments of this disclosure are described by taking that the UE is connected to two or more network devices at the same time as an example. However, this disclosure is not limited thereto; for example, the method or apparatus of this disclosure may also be applicable to scenarios where a UE is not simultaneously connected to two or more network devices.

Embodiment 1

The embodiments of this disclosure provide a command reception method, applicable to a UE and one of multiple network devices; the UE is simultaneously connected to the multiple network devices.

Figure 2:
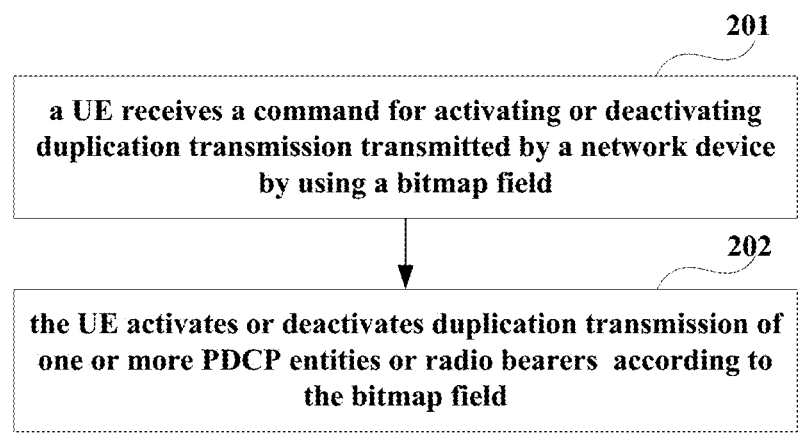
FIG. 2 is a schematic diagram of the command reception method of Embodiment 1 of this disclosure.

FIG. 2 is a schematic diagram of the command reception method of the embodiment of this disclosure, which shall be described from a UE side. As shown in FIG. 2, the command reception method includes:

Block 201: a UE receives a command for activating or deactivating duplication transmission transmitted by a network device by using a bitmap field; and Block 202: the UE activates or deactivates duplication transmission of one or more packet data convergence protocol entities or radio bearers according to the bitmap field.

In an embodiment, one bit in the bitmap field may correspond to a PDCP entity or an RB, or one pair of bits in the bitmap field (e.g. two or a pair; however, this disclosure is not limited thereto, and they may also be more than two) may correspond to a PDCP entity or an RB.

In an embodiment, the radio bearers (RBs) may include a data radio bearer (DRB) and/or a signaling radio bearer (SRB); however, this disclosure is not limited thereto, and following description shall be given by taking a DRB as an example. And furthermore, reference may be made to related technologies for detailed contents of the PDCP and RB.

In an embodiment, an i-th bit or an i-th pair of bits in the bitmap field may correspond to a PDCP entity of DRB identity (drb-identity or DRB identity) being i.

For example, a UE may support 32 (this disclosure is not limited thereto, and it may also be other numbers) PDCP entities, the corresponding DRB identities are denoted by 0 to 31, and the bitmap field may include 32 bits, corresponding respectively to these 32 PDCP entities.

For another example, a UE may support 32 (this disclosure is not limited thereto, and it may also be other numbers) PDCP entities, the corresponding DRB identities are denoted by 0 to 31, and the bitmap field may include 32 pairs of bits (i.e. 64 bits), corresponding respectively to the 32 PDCP entities.

In another embodiment, the i-th bit or the i-th pair of bits in the bitmap field may correspond to a packet data convergence protocol entity with a duplication transmission identity being i. The duplication transmission identity may be configured by a network device side and be independent of the DRB identity.

For example, a UE may support 32 (this disclosure is not limited thereto, and it may also be other numbers) PDCP entities, the corresponding duplication transmission identities are denoted by 0 to 31, and the bitmap field may include 32 bits, corresponding respectively to these 32 PDCP entities.

For another example, a UE may support 32 (this disclosure is not limited thereto, and it may also be other numbers) PDCP entities, the corresponding duplication transmission identities are denoted by 0 to 31, and the bitmap field may include 32 pairs of bits (i.e. 64 bits), corresponding respectively to these 32 PDCP entities.

In another embodiment, the i-th bit or the i-th pair of bits in the bitmap field may correspond to an i-th PDCP entity in sorted PDCP entities in the UE configured as duplication transmission.

For example, a UE may support 32 (this disclosure is not limited thereto, and it may also be other numbers) PDCP entities, in which, for example, 8 PDCP entities may be configured by the network device to use a duplication transmission mode (i.e. duplication transmission is activated), and the 8 PDCP entities configured as duplication transmission may be sorted.

It should be noted that the above i-th bit or the i-th pair of bits may be determined according to a descending order of bit sequences, or may be determined by another sorting manner. For example, the i-th bit may be a bit to which an index i corresponds; or an initial value of i may be 0 or 1 or any other arbitrarily determined value, and so on. This disclosure is not limited thereto, and a particular value of i may be determined according to an actual situation.

In one example, the PDCP entities configured as duplication transmission may be sorted in an order in which the network device configures the duplication transmission. Or, in another example, the sorting may be performed according to a sequential order of the DRB identities to which the PDCP entities correspond. It should be noted that the above only schematically illustrates how to sort the PDCP entities configured as duplication transmission; however, this disclosure is not limited thereto, and other suitable sorting methods may also be employed.

For example, the PDCP entities configured as duplication transmission may be denoted by 0 to 7 after being sorted, and the bitmap field may include 8 bits, corresponding respectively to the 8 PDCP entities configured as duplication transmission. Alternatively, the bitmap field may include 8 pairs of bits (i.e. 16 bits), corresponding respectively to the 8 PDCP entities configured as duplication transmission.

In an embodiment, for one bit or multiple bits in the bitmap field, the UE may determine whether a corresponding PDCP entity is associated with the network device transmitting the command, or whether a peer PDCP entity is in the network device transmitting the command;

read the one bit or more bits in the bitmap field when it is determined that the corresponding PDCP entity is associated with the network device transmitting the command, or the peer PDCP entity is in the network device transmitting the command; and neglect the one bit or more bits in the bitmap field when it is determined that the corresponding PDCP entity is not associated with the network device transmitting the command, or the peer PDCP entity is not in the network device transmitting the command.

Figure 3:
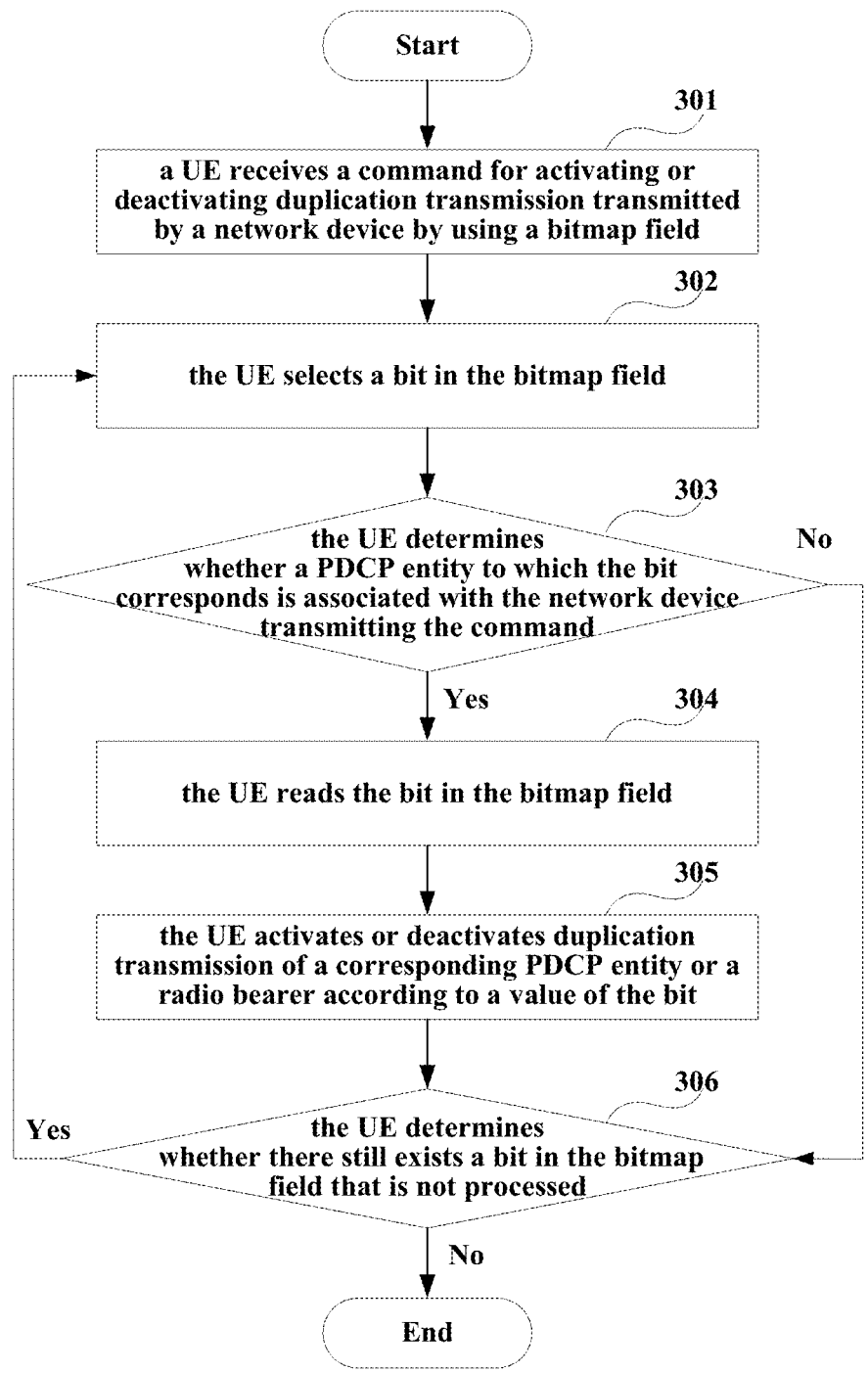
FIG. 3 is another schematic diagram of the command reception method of Embodiment 1 of this disclosure.

FIG. 3 is another schematic diagram of the command reception method of the embodiment of this disclosure, which shall be described from the UE side. For the sake of simplicity, description shall be given by taking that an indication granularity is 1 bit and whether a PDCP entity is associated with the network device as examples, and cases are the same where an indication granularity is multiple bits.

As shown in FIG. 3, the command reception method includes:

Block 301: a UE receives a command for activating or deactivating duplication transmission transmitted by a network device by using a bitmap field.

Block 302: the UE selects a bit in the bitmap field.

Block 303: the UE determines whether a PDCP entity to which the bit corresponds is associated with the network device transmitting the command, and executing block 304 if yes, otherwise, executing block 306 and neglecting the bit.

Block 304: the UE reads a value of the bit in the bitmap field.

Block 305: the UE activates or deactivates duplication transmission of a corresponding PDCP entity or a radio bearer according to the value of the bit; and Block 306: the UE determines whether there still exists a bit in the bitmap field that is not processed, and executing block 302 and reselecting another bit for processing, otherwise, terminating this time of processing.

It should be noted that FIG. 3 only schematically explains the embodiment of this disclosure; however, this disclosure is not limited thereto. For example, an order of execution of the blocks may be appropriately adjusted; and furthermore, some other blocks may be added, or some of these blocks may be reduced. And appropriate modifications may be made by those skilled in the art according to what is described above, without being limited to those contained in FIG. 3.

Figure 4:
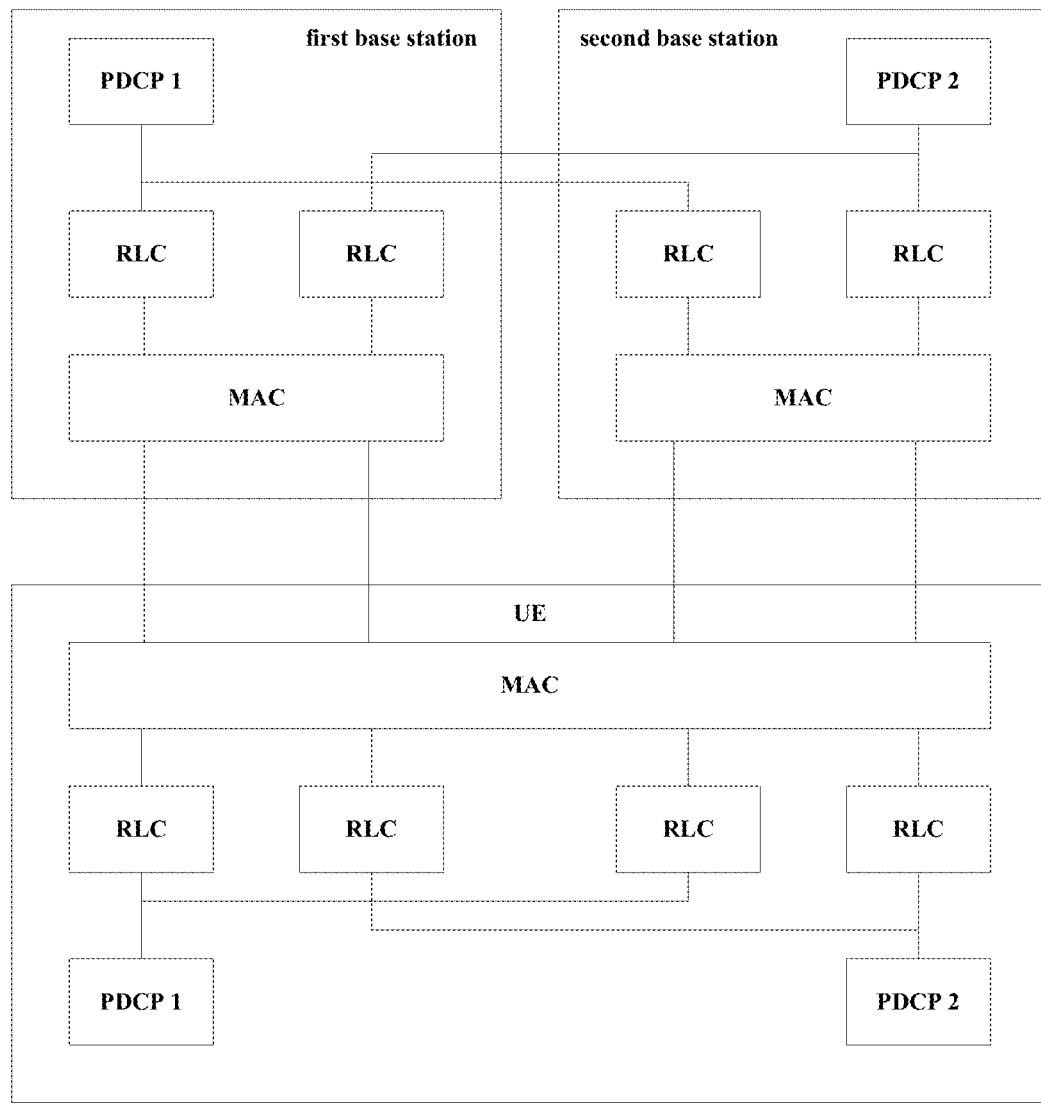
FIG. 4 is an exemplary diagram of a PDCP entity of Embodiment 1 of this disclosure.

FIG. 4 is an exemplary diagram of the PDCP entity of the embodiment of this disclosure, next block 303 is schematically explained.

As shown in FIG. 4, the UE is connected to a first base station and a second base station; PDCP 1 and PDCP 2 exist in the UE, and correspondingly, a peer PDCP 1 of PDCP 1 is at the first base station or PDCP 1 is associated with the first base station, and a peer PDCP 2 of PDCP 2 is at the second base station or PDCP 2 is associated with the second base station. According to various configurations or definitions, the UE may learn base stations where peer PDCP entities of the PDCP entities are located or base stations with which the PDCP entities are associated. And reference may be made to related technologies for details.

For example, the UE receives a command transmitted by the first base station for activating or deactivating duplication transmission, and the command includes a bitmap field, such as 11010011. For example, a first bit corresponds to PDCP 1, and as peer PDCP 1 of PDCP 1 is in the first base station or PDCP 1 is associated with the first base station, for this bit, the UE may read a value "1" of the bit, and activates duplication transmission of PDCP1 according to this value.

For another example, the UE receives a command transmitted by the second base station for activating or deactivating duplication transmission, and the command includes a bitmap field, such as 11010011. For example, a first bit corresponds to PDCP 1, and as peer PDCP 1 of PDCP 1 is in the first base station or PDCP 1 is associated with the first base station, for this bit, the UE does not read a value "1" of the bit, and neglects this bit.

In an embodiment, a value of one bit or one pair of bits (such as two or a pair) in the bitmap field may be used to indicate to change a transmission status of a corresponding PDCP entity, and another value may be used to indicate to maintain the transmission status of the corresponding PDCP entity.

For example, bit "1" may be used to indicate the UE to change the transmission status of the corresponding PDCP entity. That is, if an original transmission status of the PDCP entity is an activated status of duplication transmission, the UE is indicated to change the transmission status of the PDCP entity into a deactivated status of duplication transmission; and if the original transmission status of the PDCP entity is a deactivated status of duplication transmission, the UE is indicated to change the transmission status of the PDCP entity into the activated status of duplication transmission. And bit "0" may be used to indicate the UE to maintain a current transmission status of the PDCP entity, without needing to change the activated or deactivated state.

For another example, bit "0" may be used to indicate the UE to change a transmission status of a corresponding PDCP entity. That is, if an original transmission status of the PDCP entity is an activated status of duplication transmission, the UE is indicated to change the transmission status of the PDCP entity into a deactivated status of duplication transmission; and if the original transmission status of the PDCP entity is a deactivated status of duplication transmission, the UE is indicated to change the transmission status of the PDCP entity into the activated status of duplication transmission. And bit "1" may be used to indicate the UE to maintain a current transmission status of the PDCP entity, without needing to change the activated or deactivated state.

For example, bits "11" may be used to indicate the UE to change a transmission status of a corresponding PDCP entity. That is, if an original transmission status of the PDCP entity is an activated status of duplication transmission, the UE is indicated to change the transmission status of the PDCP entity into a deactivated status of duplication transmission; and if the original transmission status of the PDCP entity is a deactivated status of duplication transmission, the UE is indicated to change the transmission status of the PDCP entity into the activated status of duplication transmission. And bits "00" may be used to indicate the UE to maintain a current transmission status of the PDCP entity, without needing to change the activated or deactivated state.

For example, bits "00" may be used to indicate the UE to change a transmission status of a corresponding PDCP entity. That is, if an original transmission status of the PDCP entity is an activated status of duplication transmission, the UE is indicated to change the transmission status of the PDCP entity into a deactivated status of duplication transmission; and if the original transmission status of the PDCP entity is a deactivated status of duplication transmission, the UE is indicated to change the transmission status of the PDCP entity into the activated status of duplication transmission. And bits "11" may be used to indicate the UE to maintain a current transmission status of the PDCP entity, without needing to change the activated or deactivated state.

For another example, "11" is used to indicate to activate duplication transmission of the PDCP entity, and the PDCP entity performs duplication transmission on multiple links at the same time; "00" is used to indicate to deactivate the duplication transmission of the PDCP entity, and the PDCP entity performs split transmission simultaneously on multiple links; "10" is used to indicate to deactivate the duplication transmission of the PDCP entity, and the PDCP entity performs single link transmission on a first RLC entity; and "01" is used to indicate to deactivate the duplication transmission of the PDCP entity, and the PDCP entity performs single link transmission on a second RLC entity.

It should be noted that how to change or maintain the transmission status of the corresponding PDCP entity according to values of one or more bits is schematically described above. However, this disclosure is not limited thereto, and meanings of indication of particular values of one or more bits may be determined as actually demanded.

In an embodiment, the above-mentioned meanings of bit reading and bit indication may be combined.

For example, as to the example shown in FIG. 4, the UE receives a command transmitted by the first base station for activating or deactivating the duplication transmission, and the command includes a bitmap field, such as 11010011. For example, the first bit corresponds to PDCP 1, and as the peer PDCP 1 of PDCP 1 is in the first base station or PDCP 1 is associated with the first base station, for this bit, the UE may read the value "1" of the bit.

Bit "1" may be used to indicate the UE to change the transmission status of corresponding PDCP1 entity. That is, if the original transmission status of PDCP 1 entity is an activated status of duplication transmission, the UE is indicated to change the transmission status of PDCP 1 entity into the deactivated status of duplication transmission; and if the original transmission of PDCP 1 entity is the deactivated status of duplication transmission, the UE is indicated change the transmission status of PDCP 1 entity into the activated status of duplication transmission.

For another example, the UE receives a command transmitted by the first base station for activating or deactivating the duplication transmission, and the command includes a bitmap field, such as 01010011. For example, a first bit corresponds to PDCP 1, and as a peer PDCP 1 of PDCP 1 is in the first base station or PDCP 1 is associated with the first base station, for this bit, the UE may read a value "0" of the bit. Bit "0" may be used to indicate the UE to maintain a transmission status of corresponding PDCP1 entity.

In an embodiment, one bit or one pair of bits in the bitmap field may be used to indicate that the corresponding PDCP entity executes one of the following operations: the duplication transmission of the PDCP entity being activated, and the PDCP entity simultaneously performing duplication transmission in multiple links; the duplication transmission of the PDCP entity being deactivated, and the PDCP entity simultaneously performing split transmission in multiple links; and the duplication transmission of the PDCP entity being deactivated, and the PDCP entity performing single-link transmission in a designated radio link control (RLC) entity. For example, single-link transmission in may be performed in a first RLC entity, or single-link transmission in may be performed in a second RLC entity.

Figure 5:
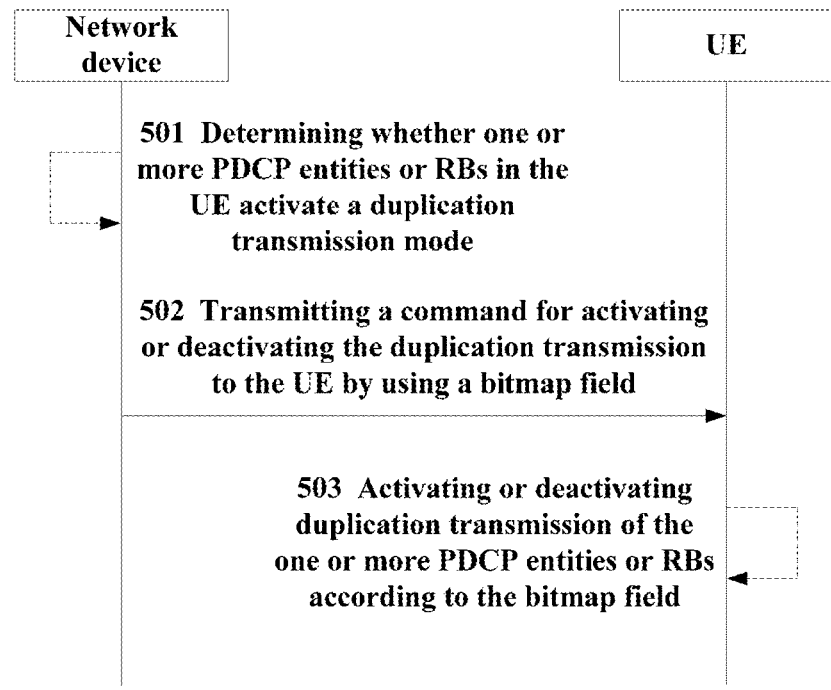
FIG. 5 is a schematic diagram of the command indication and reception method of Embodiment 1 of this disclosure.

FIG. 5 is another schematic diagram of the command reception method of the embodiment of this disclosure, which shall be described from a network device side and a UE side. As shown in FIG. 5, the command reception method includes:

501: a network device determines whether one or more PDCP entities or RBs in the UE activate a duplication transmission mode;

502: the network device transmits a command for activating or deactivating the duplication transmission to the UE by using a bitmap field; and

503: the UE activates or deactivates duplication transmission of the one or more PDCP entities or RBs according to the bitmap field after receiving the command.

For example, if a bit in the command to which a PDCP entity or RB corresponds is "1", the PDCP entity should change its transmission status. That is, if an original transmission status of the PDCP entity is an activated status of duplication transmission, the transmission status of the PDCP entity should be changed into a deactivated status of duplication transmission; and if the original transmission status of the PDCP entity is a deactivated status of duplication transmission, the transmission status of the PDCP entity should be changed into activated status of duplication transmission. And if a bit in the command to which a PDCP entity or RB corresponds is "0", the PDCP entity should maintain its transmission status.

In an embodiment, after receiving the command for activating or deactivating duplication transmission, the UE may perform one of the following according to the indication of the bitmap field: activating duplication transmission status of the PDCP entity, the PDCP entity simultaneously performing duplication transmission in multiple links; deactivating the duplication transmission of the PDCP entity, the PDCP entity simultaneously performing split transmission in multiple links, i.e. a transmission mode in which different PDCP PDUs are transmitted in different links; deactivating the duplication transmission of the PDCP entity, the PDCP entity performing single-link transmission in a first RLC entity; and deactivating the duplication transmission of the PDCP entity, the PDCP entity performing single-link transmission in a second RLC entity.

It should be noted that FIG. 5 only schematically explains the embodiment of this disclosure; however, this disclosure is not limited thereto. For example, an order of execution of the steps may be appropriately adjusted; and furthermore, some other steps may be added, or some of these steps may be reduced. And appropriate modifications may be made by those skilled in the art according to what is described above, without being limited to those contained in FIG. 5.

It can be seen from the above embodiment that the network device transmits the command for activating or deactivating duplication transmission to the UE by using the bitmap field, and the duplication transmission mode of one or more PDCP entities or RB in the UE may be activated or deactivated.

Embodiment 2

The embodiments of this disclosure provide a command reception apparatus, which may be, for example, a UE, or may be one or some components or elements configured in the UE.

Figure 6:
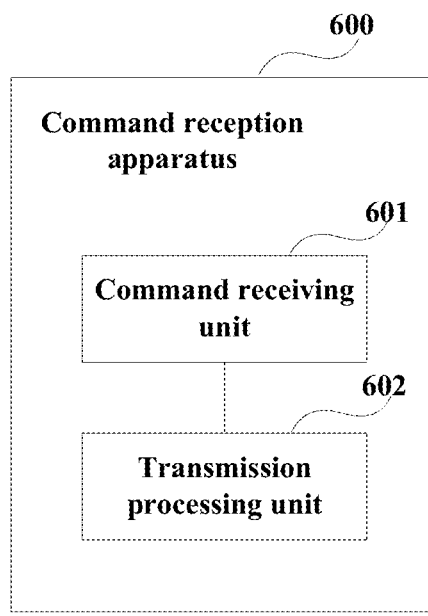
FIG. 6 is a schematic diagram of the command reception apparatus of Embodiment 2 of this disclosure.

FIG. 6 is a schematic diagram of the command reception apparatus of the embodiment of this disclosure. As shown in FIG. 6, a command reception apparatus 600 includes:

a command receiving unit 601 configured to receive a command for activating or deactivating duplication transmission transmitted by a network device by using a bitmap field; and a transmission processing unit 602 configured to activate or deactivate duplication transmission of one or more PDCP entities or RBs according to the bitmap field.

In an embodiment, one bit or one pair of bits in the bitmap field may correspond to one of the PDCP entities or RBs.

Figure 7:
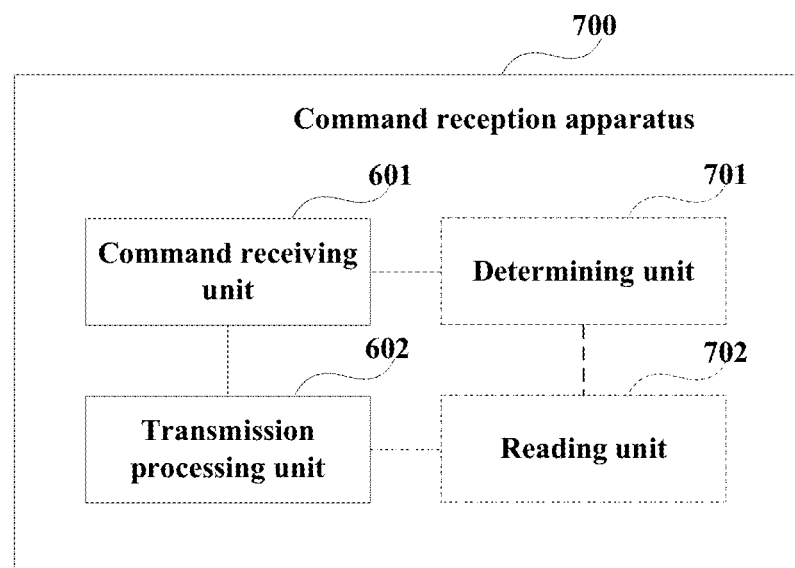
FIG. 7 is another schematic diagram of the command reception apparatus of Embodiment 2 of this disclosure.

FIG. 7 is another schematic diagram of the command reception apparatus of the embodiment of this disclosure. As shown in FIG. 7, a command reception apparatus 700 includes a command receiving unit 601 and a transmission processing unit 602, as described above.

As shown in FIG. 7, the command reception apparatus 700 may further include:

a determining unit 701 configured to, for one or more bits in the bitmap field, determine whether a corresponding packet data convergence protocol entity is associated with the network device transmitting the command, or whether a peer packet data convergence protocol entity is in the network device transmitting the command; and a reading unit 702 configured to read the one bit or more bits in the bitmap field when it is determined that the corresponding packet data convergence protocol entity is associated with the network device transmitting the command, or the peer packet data convergence protocol entity is in the network device transmitting the command. In an embodiment, the reading unit 702 may further be configured to neglect the one bit or more bits in the bitmap field when it is determined that the corresponding packet data convergence protocol entity is not associated with the network device transmitting the command, or the peer packet data convergence protocol entity is not in the network device transmitting the command.

In an embodiment, an i-th bit or an i-th pair of bits in the bitmap field correspond(s) to a PDCP entity of a data radio bearer identity being i; or an i-th bit or an i-th pair of bits in the bitmap field correspond(s) to a packet data convergence protocol entity of a duplication transmission identity being i.

In an embodiment, an i-th bit or an i-th pair of bits in the bitmap field correspond(s) to an i-th packet data convergence protocol entity in sorted packet data convergence protocol entities in the UE that are configured as duplication transmission.

For example, the packet data convergence protocol entities that are configured as duplication transmission may be sorted in a sequential order of configuring duplication transmission by a network device, or may be sorted in a sequential order of corresponding data radio bearer identities.

In an embodiment, a value of one bit or one pair of bits in the bitmap field is used to indicate changing a duplication transmission state of the corresponding packet data convergence protocol entity, and another value is used to indicate maintaining a duplication transmission state of the corresponding packet data convergence protocol entity.

In an embodiment, one bit or one pair of bits in the bitmap field is/are used to indicate that the corresponding packet data convergence protocol entity executes one of the following operations: the duplication transmission of the packet data convergence protocol entity being activated, and the packet data convergence protocol entity simultaneously performing duplication transmission in multiple links; the duplication transmission of the packet data convergence protocol entity being deactivated, and the packet data convergence protocol entity simultaneously performing split transmission in multiple links; and the duplication transmission of the packet data convergence protocol entity being deactivated, and the packet data convergence protocol entity performing single-link transmission in a designated radio link control entity.

It should be noted that components or modules related to this disclosure are only described above. However, this disclosure is not limited thereto, and the command reception apparatus 600 or 700 may further include other components or modules, and reference may be made to related technologies for particular contents of these components or modules.

It can be seen from the above embodiment that the network device transmits the command for activating or deactivating duplication transmission to the UE by using the bitmap field, and the duplication transmission mode of one or more PDCP entities or RB in the UE may be activated or deactivated.

Embodiment 3

The embodiments of this disclosure provide a communication system, reference may be made to FIG. 1, and contents identical to those in Embodiment 1 or 2 shall not be described herein any further. In these embodiments, the communication system 100 may include:

a network device 101 or 102 configured to transmit a command for activating or deactivating duplication transmission to a UE by using a bitmap field; and a UE 103 configured with the command reception apparatus 600 or 700 as described in Embodiment 2.

The embodiment of this disclosure further provides a network device, such as a base station; however, this disclosure is not limited thereto, and may also be other network devices.

Figure 8:
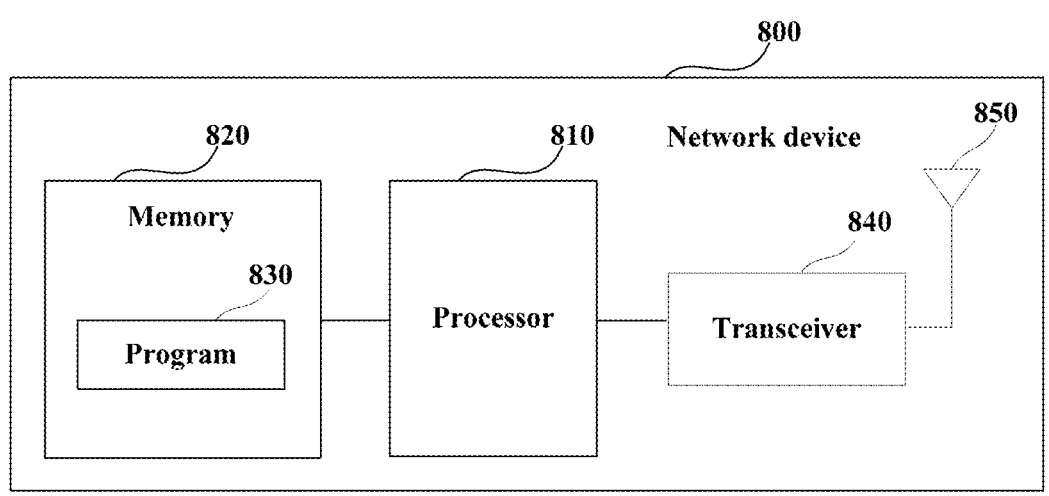
FIG. 8 is a schematic diagram of the network device of Embodiment 3 of this disclosure.

FIG. 8 is a schematic diagram of a structure of the network device of the embodiment of this disclosure. As shown in FIG. 8, a network device 800 may include a processor (such as central processing unit, CPU) 810 and a memory 820, the memory 820 being coupled to the processor 810. The memory 820 may store various data, and furthermore, it may store a program 830 for data processing, and execute the program 830 under control of the processor 810.

For example, the processor 810 may be configured to perform the following control: transmitting a command for activating or deactivating duplication transmission to a UE by using a bitmap field, so as to activate or deactivate duplication transmission of one or more PDCP entities or RBs in the UE.

Furthermore, as shown in FIG. 8, the network device 800 may include a transceiver 840, and an antenna 850, etc. Functions of the above components are similar to those in the relevant art, and shall not be described herein any further. It should be noted that the network device 800 does not necessarily include all the parts shown in FIG. 8, and furthermore, the network device 800 may include parts not shown in FIG. 8, and the relevant art may be referred to.

The embodiment of this disclosure further provides a UE; however, this disclosure is not limited thereto, and may also be other network devices.

Figure 9:
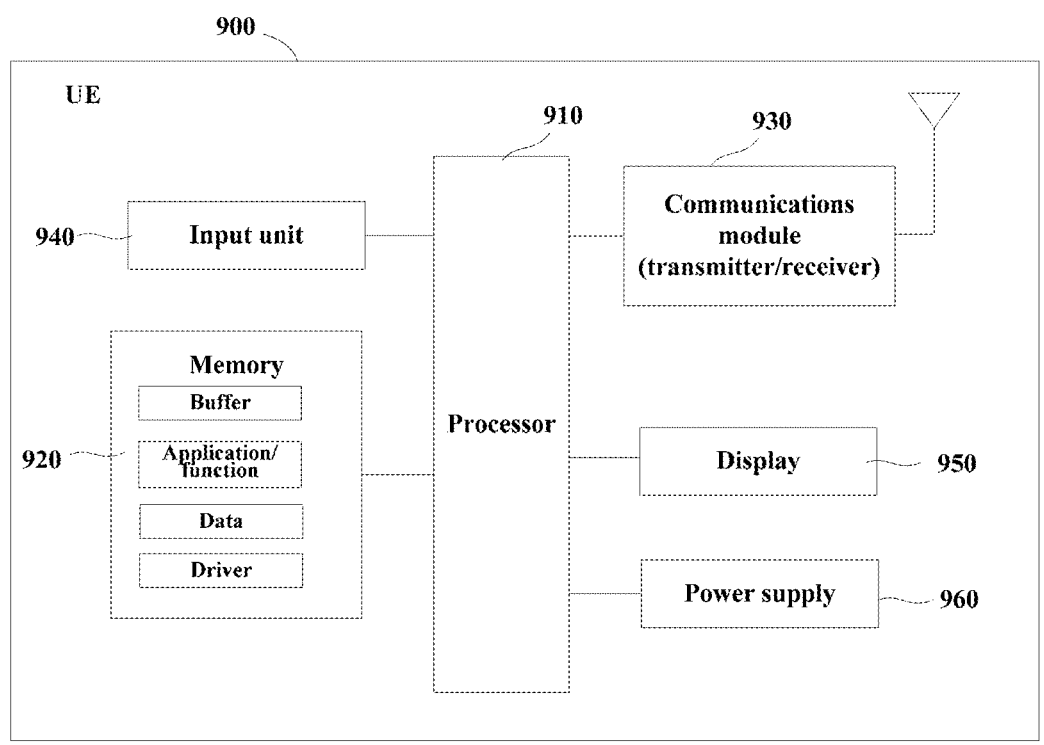
FIG. 9 is a schematic diagram of the UE of Embodiment 3 of this disclosure.

FIG. 9 is a schematic diagram of the UE of the embodiment of this disclosure. As shown in FIG. 9, a UE 900 may include a processor 910 and a memory 920, the memory 920 storing various data and being coupled to the processor 910. It should be noted that this figure is illustrative only, and other types of structures may also be used, so as to supplement or replace this structure and achieve a telecommunications function or other functions.

For example, the processor 910 may be configured to perform the following control: receiving a command for activating or deactivating duplication transmission transmitted by a network device by using a bitmap field; and activating or deactivating duplication transmission of one or more PDCP entities or RBs according to the bitmap field.

As shown in FIG. 9, the UE 900 may further include a communication module 930, an input unit 940, a display 950 and a power supply 960. Functions of the above components are similar to those in the relevant art, and shall not be described herein any further. It should be noted that the UE 900 does not necessarily include all the parts shown in FIG. 9, and the above components are not necessary; and furthermore, the UE 900 may include parts not shown in FIG. 9, and the relevant art may be referred to.

An embodiment of the present disclosure provides a computer readable program, which, when executed in a network device, will cause the network device to carry out the command reception method as described in Embodiment 1.

An embodiment of the present disclosure provides a computer storage medium, including a computer readable program, which will cause a network device to carry out the command reception method as described in Embodiment 1.

An embodiment of the present disclosure provides a computer readable program, which, when executed in a UE, will cause the UE to carry out the command reception method as described in Embodiment 1.

An embodiment of the present disclosure provides a computer storage medium, including a computer readable program, which will cause a UE to carry out the command reception method as described in Embodiment 1.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or blocks as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 6 may either correspond to software modules of procedures of a computer program, or correspond to hardware modules. Such software modules may respectively correspond to the blocks shown in FIG. 2. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the accompanying drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A data transmission method, comprising:
receiving a command for activating or deactivating duplication transmission of packet data convergence protocol (PDCP) protocol data units (PDUs) of one or more PDCP entities, the command transmitted by a network device via a bitmap field, wherein an i-th bit or an i-th pair of bits in the bitmap field corresponds to an i-th PDCP entity of a radio bearer that is configured as duplication transmission, and PDCP entities configured as duplication transmission are sorted; and
activating or deactivating duplication transmission of PDCP PDUs of the one or more PDCP entities of corresponding radio bearers according to the bitmap field,
wherein when a value of one bit or one pair of bits in the bitmap field indicates to activate the duplication transmission of PDCP PDUs of the PDCP entity,
performing, duplication transmission of PDCP PDUs of the PDCP entity in multiple links, wherein one link corresponds to a radio link control entity or a logical channel, and when a value of one bit or one pair of bits in the bitmap field indicates to deactivate the duplication transmission of PDCP PDUs of the PDCP entity, performing one of the following operations: split transmission of PDCP PDUs of the PDCP entity in multiple links, in which different PDCP PDUs are transmitted in different links for the split transmission, wherein one link corresponds to a radio link control entity or a logical channel; and
single-link transmission of PDCP PDUs of the PDCP entity in a designated radio link control (RLC) entity.

2. The data transmission method according to claim 1, wherein the method further comprises:
for one bit or one pair of bits in the bitmap field, determining whether a corresponding PDCP entity is associated with the network device transmitting the command, or whether a peer PDCP entity is in the network device transmitting the command; and
reading the one bit or one pair of bits in the bitmap field when it is determined that the corresponding PDCP entity is associated with the network device transmitting the command, or the peer PDCP entity is in the network device transmitting the command.

3. The data transmission method according to claim 2, wherein the method further comprises:
neglecting the one bit or one pair of bits in the bitmap field when it is determined that the corresponding PDCP entity is not associated with the network device transmitting the command, or the peer PDCP entity is not in the network device transmitting the command.

4. The data transmission method according to claim 1, wherein the PDCP entities that are configured as duplication transmission are sorted in a sequential order of corresponding radio bearer identities.

5. A data transmission apparatus, comprising:
a memory that stores a plurality of instructions; and
a processor coupled to the memory and configured to execute the instructions to:
receive a command for activating or deactivating duplication transmission of packet data convergence protocol (PDCP) protocol data units (PDUs) of one or more PDCP entities, the command transmitted by a network device via a bitmap field, wherein an i-th bit or an i-th pair of bits in the bitmap field corresponds to an i-th PDCP entity of a radio bearer that is configured as duplication transmission, and PDCP entities configured as duplication transmission are sorted; and activate or deactivate duplication transmission of PDCP PDUs of the one or more PDCP entities of corresponding radio bearers according to the bitmap field, wherein when a value of one bit or one pair of bits in the bitmap field indicates to activate the duplication transmission of PDCP PDUs of the PDCP entity, perform duplication transmission of PDCP PDUs of the PDCP entity in multiple links, wherein one link corresponds to a radio link control entity or a logical channel, and when a value of one bit or one pair of bits in the bitmap field indicates to deactivate the duplication transmission of PDCP PDUs of the PDCP entity perform one of the following operations:

split transmission of PDCP PDUs of the PDCP entity in multiple links, in which different PDCP PDUs are transmitted in different links for the split transmission, wherein one link corresponds to a radio link control entity or a logical channel; and single-link transmission of PDCP PDUs of the PDCP entity in a designated radio link control (RLC) entity.

6. The data transmission apparatus according to claim 5, wherein the processor is further configured to:

determine, for one bit or one pair of bits in the bitmap field, whether a corresponding PDCP entity is associated with the network device transmitting the command, or whether a peer PDCP entity is in the network device transmitting the command; and read the one bit or one pair of bits in the bitmap field when it is determined that the corresponding PDCP entity is associated with the network device transmitting the command, or the peer PDCP entity is in the network device transmitting the command.

7. The data transmission apparatus according to claim 6, wherein the processor is further configured to neglect the one bit or one pair of bits in the bitmap field when it is determined that the corresponding PDCP entity is not associated with the network device transmitting the command, or the peer PDCP entity is not in the network device transmitting the command.

8. The data transmission apparatus according to claim 5, wherein the PDCP entities that are configured as duplication transmission are sorted in a sequential order of corresponding radio bearer identities.

9. A communication system, comprising:

a network device configured to transmit a command for activating or deactivating duplication transmission of packet data convergence protocol (PDCP) protocol data units (PDUs) of one or more PDCP entities via a bitmap field, wherein one bit or one pair of bits in the bitmap field corresponds to one of a plurality of radio bearers; and a user equipment configured to: receive the command transmitted by the network device, and activate or deactivate duplication transmission of PDCP PDUs of the one or more PDCP entities of corresponding radio bearers according to the bitmap field, wherein an i-th bit or an i-th pair of bits in the bitmap field corresponds to an i-th PDCP entity of a radio bearer that is configured as duplication transmission, and wherein PDCP entities configured as duplication transmission are sorted; i is an integer;

activate, according to a value of one bit or one pair of bits in the bitmap field, the duplication transmission of PDCP PDUs of the PDCP entity and perform, simultaneously, duplication transmission of PDCP PDUs of the PDCP entity in multiple links, wherein one link corresponds to a radio link control entity or a logical channel and another value of one bit or one pair of bits in the bitmap field is used to indicate one of the following operations:

deactivate the duplication transmission of PDCP PDUs of the PDCP entity and perform, simultaneously, split transmission of PDCP PDUs of the PDCP entity in multiple links, in which different PDCP PDUs are transmitted in different links for the split transmission, wherein one link corresponds to a radio link control entity or a logical channel; and deactivate the duplication transmission of PDCP PDUs of the PDCP entity and perform single-link transmission of PDCP PDUs of the PDCP entity in a designated radio link control (RLC) entity.

* * * * *